Dec. 6, 1949     E. B. ROBINSON     2,490,544
BEARING FOR DRAWING FRAMES
Filed July 16, 1946     4 Sheets-Sheet 1
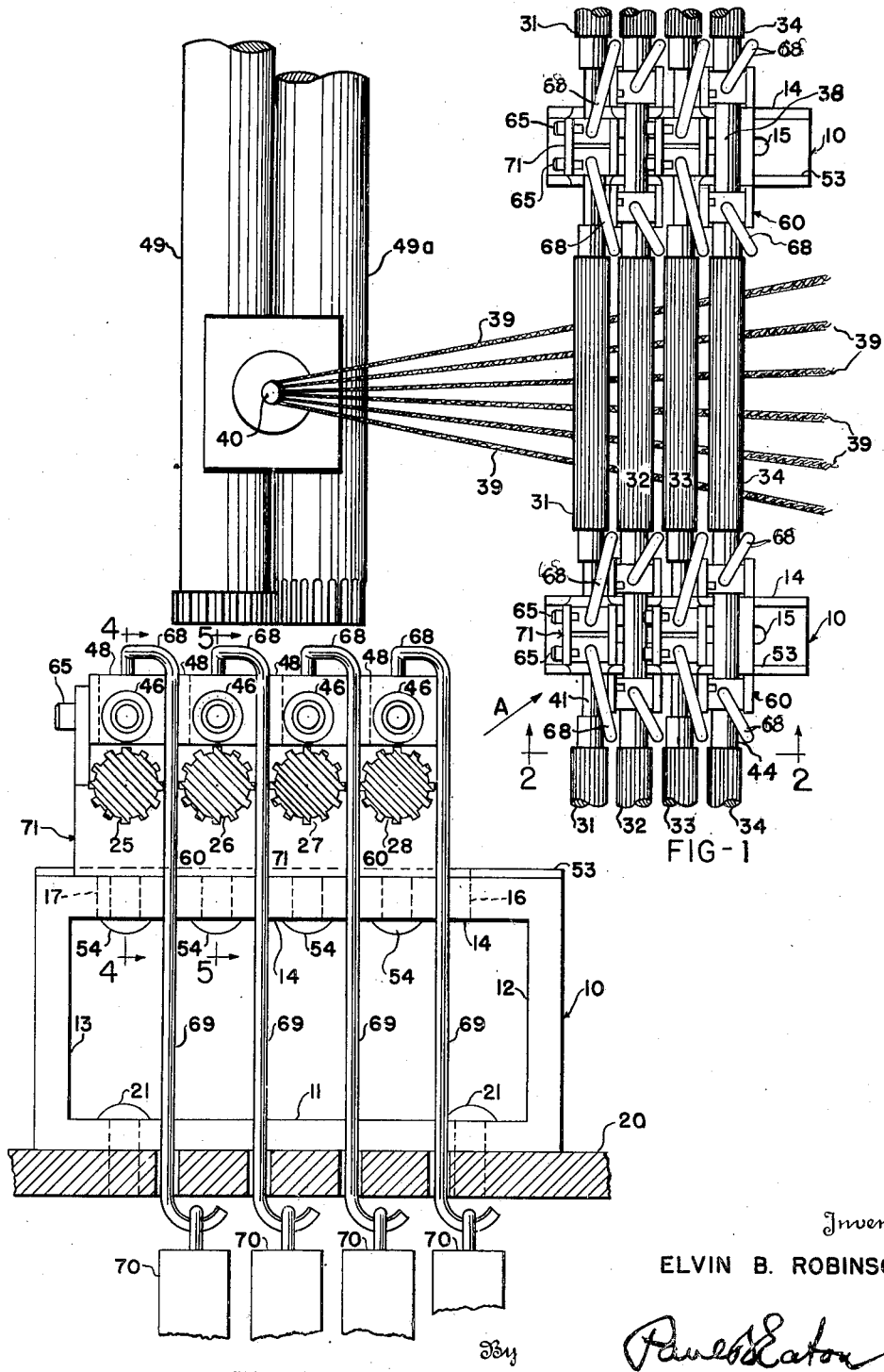
Inventor:
ELVIN B. ROBINSON Dec. 6, 1949  E. B. ROBINSON  2,490,544
BEARING FOR DRAWING FRAMES
Filed July 16, 1946  4 Sheets-Sheet 2

Inventor:
ELVIN B. ROBINSON
By Paul S. Eaton
Attorney

Dec. 6, 1949     E. B. ROBINSON     2,490,544
BEARING FOR DRAWING FRAMES

Filed July 16, 1946     4 Sheets-Sheet 3

Inventor:
ELVIN B. ROBINSON

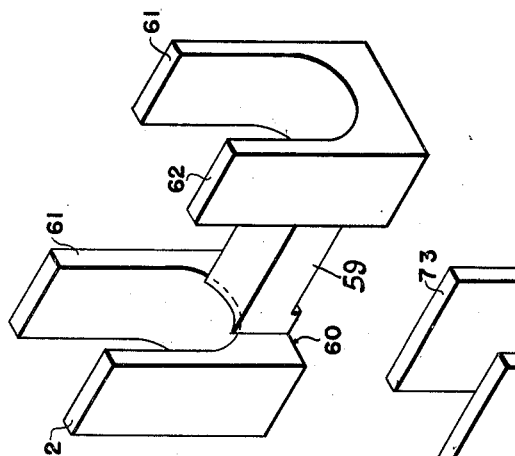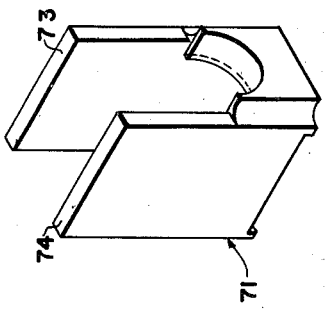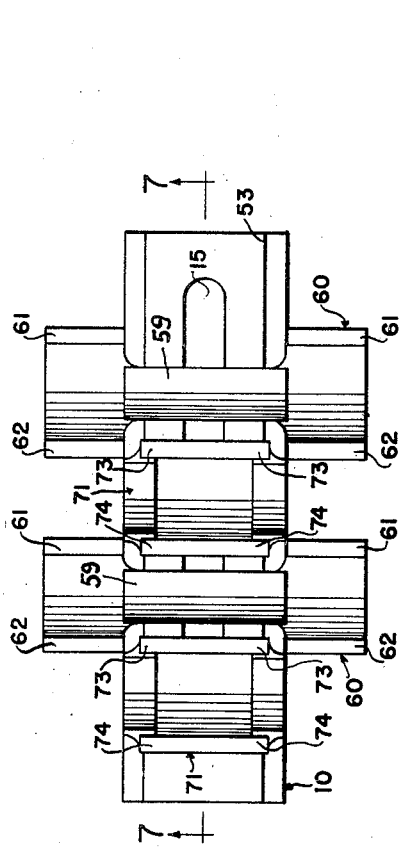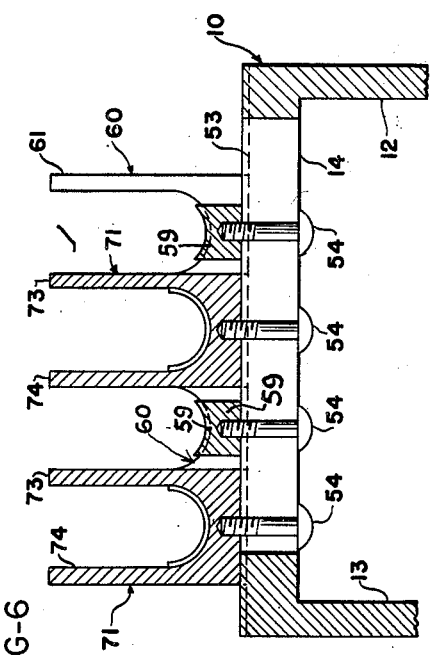

Patented Dec. 6, 1949

2,490,544

UNITED STATES PATENT OFFICE 2,490,544

BEARING FOR DRAWING FRAMES

Elvin B. Robinson, Gastonia, N. C., assignor of one-third to Clarence Jack Costner and one-third to Arnold W. Kincaid, both of Bessemer City, N. C.

Application July 16, 1946, Serial No. 683,886

4 Claims. (Cl. 19—134)

This invention relates to a drawing frame, and more especially to means for mounting the top and bottom rolls of a drawing frame, in such a manner that they can be spaced very closely each pair from the other, or very much more closely than has heretofore been possible, where all of the bearings are mounted in straight lines. In the present invention, means are provided whereby the bearings can be mounted in staggered relation to each other, and thus the sets of top and bottom rolls can be placed very much closer to each other than has heretofore been possible. Also the ends of the rollers or the roller necks can be mounted in anti-friction bearings so that they will at all times maintain a definite relation to each other as to distance, thus eliminating the necessity of building up the bosses on the roller necks or the ends of the bosses to insure that the proper bite or grip between the top and bottom rollers is attained. By the use of anti-friction bearings for both the top and bottom rollers, this wear between the top and bottom rollers is eliminated and great saving is accomplished not only in re-forming and building up the bosses which determine the distance between the top and bottom rolls, but a better quality of work, which is impossible when the bosses become worn.

It is, therefore, an object of this invention to provide means for mounting the top and bottom rollers of a drawing frame wherein the bearings are staggered with relation to each other so as to permit the sets of rolls to be placed closer together than has heretofore been accomplished, thus resulting in better drafting. Also in providing anti-friction bearings for these top and bottom rollers, to thus maintain a definite distance between the top and bottom rollers at all times.

Some of the objects of the invention having been stated, other objects will appear as the description proceeds, when taken in connection with the accompanying drawings, in which:

Figure 1 is a top plan view of a portion of a drawing frame showing the invention applied thereto;

Figure 2 is a vertical sectional view taken along the line 2—2 in Figure 1 with upper rollers omitted;

Figure 6 is a top plan view of the bearing stand and bearing blocks, omitting the rollers and their bearings;

Figure 7 is a sectional view taken along the line 7—7 in Figure 6;

Figure 8 is an isometric view of one of the bearing blocks 60;

Figure 9 is an isometric view of one of the bearing blocks 71.

Figure 3:
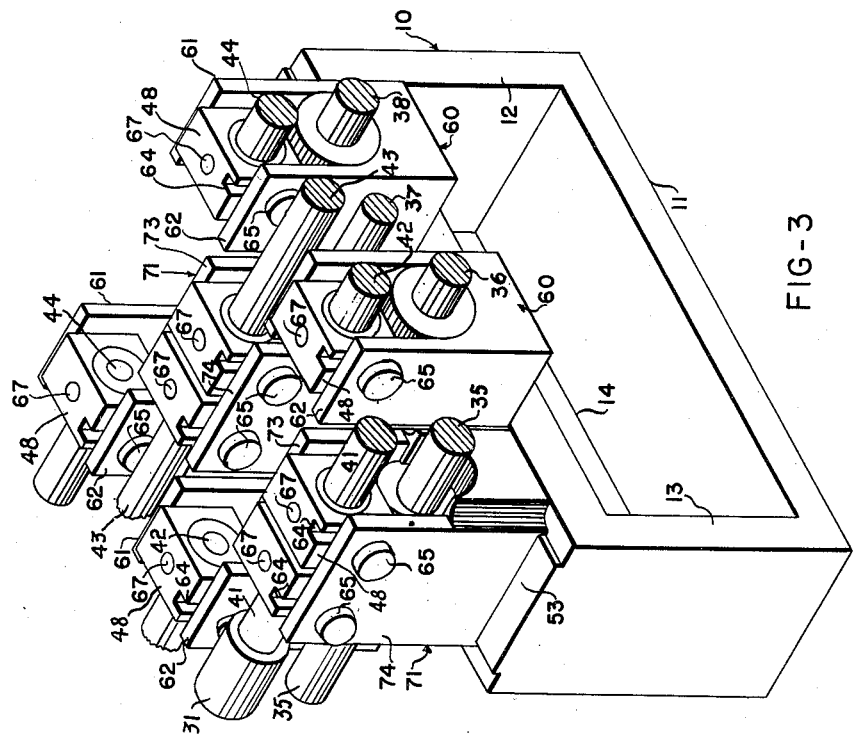
Figure 3 is an isometric view of one of the bearing assemblies looking in the direction of the arrow A in Figure 1 and omitting the weight applying means, and showing the roller necks broken away.
Figure 4:
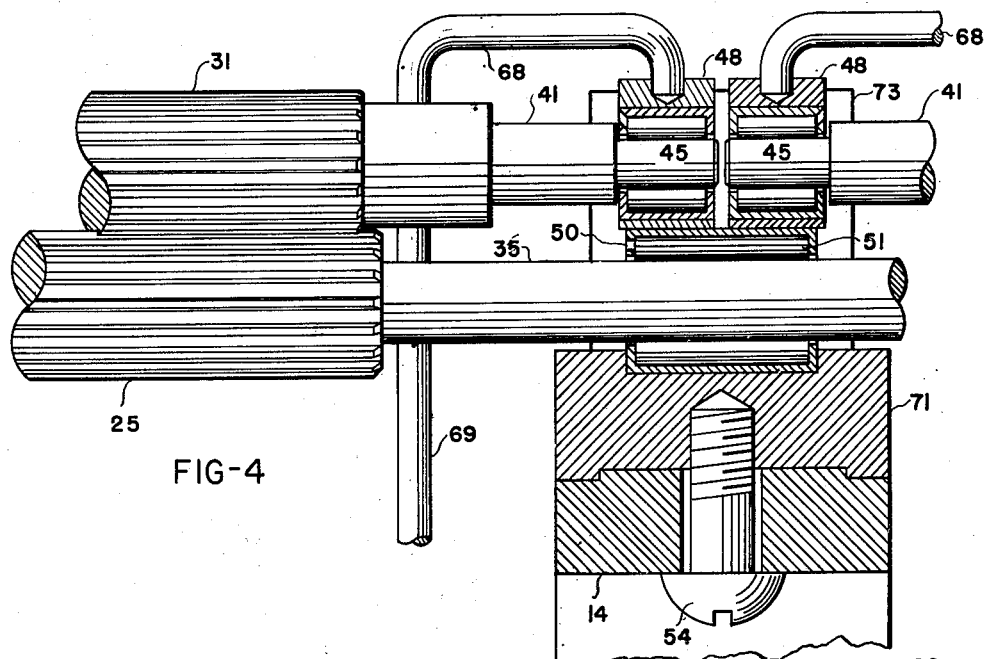
Figure 4 is a vertical sectional view taken along the line 4—4 in Figure 2.
Figure 5:
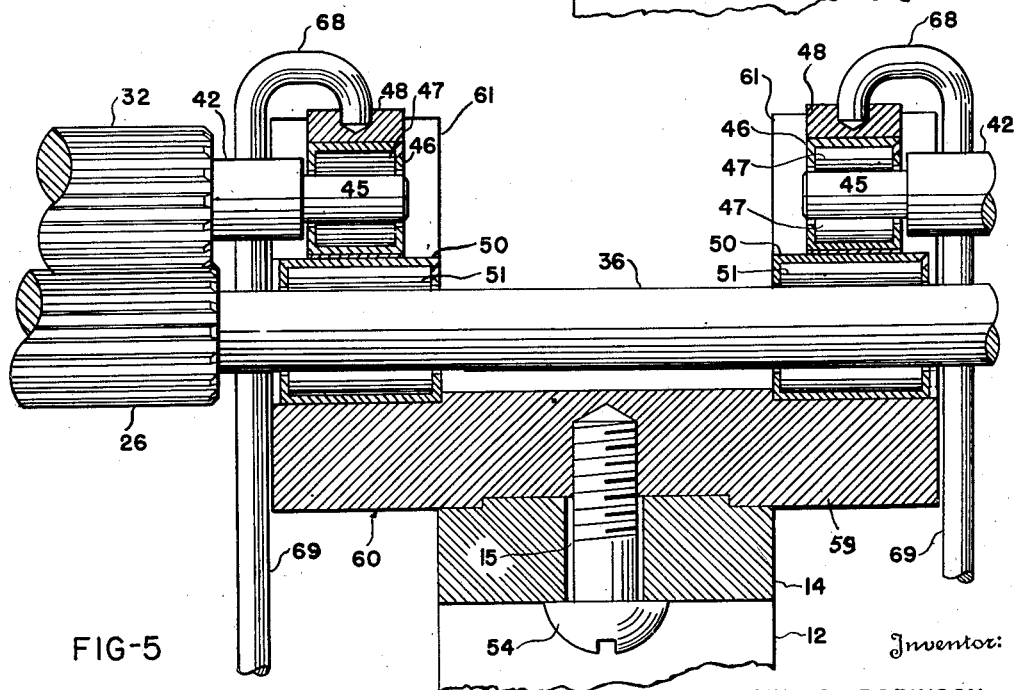
Figure 5 is a vertical sectional view taken along the line 5—5 in Figure 2.

Referring more specifically to the drawings, the numeral 10 indicates a bearing stand having a lower horizontal portion 11, which is adapted to be secured to the main frame 20 of the machine in any suitable manner, such as by screws 21, and the upper and vertical legs 12 and 13 and an upper horizontal portion 14, which upper horizontal portion is slotted as at 15, from near one end to the other, or from the dotted line 16 in Figure 2 to the dotted line 17 in the left hand portion of Figure 2.

The bottom rolls of the drawing frame are indicated at 25, 26, 27 and 28, while the top rolls are indicated by reference characters 31, 32, 33 and 34. A plurality of slivers 39 are adapted to be passed between the top and bottom rolls, and through a suitable eye 40, being drawn by conventional gripping rollers 49 and 49a. The bottom rollers 25 to 28 inclusive are connected together by suitable elongated roller necks 35, 36, 37 and 38, which are secured in the ends of the fluted portions of the lower rolls in any conventional manner, as by a pressed fit, or by a square male and female connection, as is conventional.

The top rollers 31 and 33 have long roller necks 41 and 43 respectively, whereas the top rollers 32 and 34 have short roller necks 42 and 44 respectively, each of which has a restricted portion 45 rotatably fitting into a roller bearing 46, having rollers 47 therein. Bearing 46 is secured by means of a pressed fit in a housing 48. The housings 48 are adapted to rest on the exterior casing 50 of a roller bearing having rollers 51 therein and which casings 50 are penetrated by the elongated roller necks 35, 36, 37 and 38.

It is to be noted that roller necks 36 and 38 have two of these bearings 50 thereon, whereas the other two roller necks 35 and 37 have only one centrally disposed roller bearing 59 thereon.

The upper surface of horizontal portion 14 is dove-tailed or has a protuberance as at 53, and a number of bearing blocks are secured thereto, by means of suitable bolts 54. There are two elongated bearing blocks 60 for accommodating the first and third set of rollers beginning from the rear of the machine.

Each of these bearing blocks 60 has a restricted web portion 59 which has at each end thereof upstanding vertically disposed portions 61 and 62 forming bearing block portion of greater width than the web portions in the bottom of which the roller bearings 50 are adapted to fit and bearing housings 48 for the roller bearings 46 are adapted to fit down between the upstanding portions 61 and 62 and rest on top of the roller bearings 50. The housings 48 each have a vertically disposed groove 64 therein and a set screw 65 is threadably mounted in the upstanding portion 62 for entering the groove 64 for guiding the housing 48 in its up and down movement.

The web portion 59 of each of the bearing blocks 60 rests on the upper horizontal portion 14 of member 10 and is secured in position by means of screw 54 penetrating the slot 15 and being threadably embedded in the bridging portion 59 of the bearing blocks 60.

The top surface of each housing 48 has a cavity 67 therein, into which the downwardly projecting end of a hooked portion 68 of weight bars 69 is adapted to fit, said weight bars projecting downwardly and having a suitable weight 70 secured on their lower ends, after the weight bars penetrate the bed plate 20 of the machine.

For the second from the rear set of top and bottom rolls and for the front top and bottom rolls another type of bearing block is provided and is indicated by reference character 71. These bearing blocks 71 are secured to the horizontal portion 14 in an identical manner to that described for the bearing blocks 60 and like reference characters will apply.

The bearing blocks 71 have upstanding spaced side portions 73 and 74 and a single roller bearing 50 is adapted to rest in the bottom of the cavity formed by the upstanding portion 73 and 74. Bearing housings 48 previously described are adapted to rest on top of the roller bearings 50, these being identical to the bearing members previously described for the other top rollers and like references will apply including the weight hooks and weights associated therewith.

It is noted that all of the bearing blocks 60 and 71 are recessed at their bottom forming a cavity into which the roller bearings 50 are adapted to fit to thus prevent endwise movement of the roller bearings 50 relative to the bearing blocks.

It is to be observed that the distances between the bearing blocks 60 is not regulated by the bearing blocks 71 and likewise the distance between the bearing blocks 71 is not regulated by the bearing block 60. In other words, bearing blocks 60 can be moved as close together as desired so long as the uprising bearing block portions 61 and 62 do not contact the roller necks of the top and bottom rolls mounted in the bearing blocks 71, and likewise the bearing blocks 71 can be moved as close together as desired, so long as the roller necks therein do not contact the vertically disposed portions 61 and 62 of the bearing blocks 60. By observing Figures 1, 6 and 7, it is seen there that the bearing blocks are in overlapped relation to each other, thus permitting the top and bottom rollers of the drawing frame to be adjusted to a much closer distance with relation one set of rolls to the other than would be possible if all of the bearing blocks were mounted in a straight line as has heretofore been the custom.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. In a drawing frame having a plurality of sets of top and bottom rolls having roller necks with bearings thereon, bearing stands and bearing blocks mounted thereon for receiving the top and bottom rolls for rotation, alternate bearing blocks being disposed along the longitudinal center of the bearing stand and having transversely disposed slots therein for receiving the bearings on the top and bottom rolls, the other bearing blocks for the other top and bottom rolls comprising an elongated web portion having an uprising block integral with each of its ends, the web portion being of less width than the width of the bearing blocks on its ends, whereby the bearing blocks for the alternate rolls can fit in overlapping relation with the bearing blocks on the ends of the other rolls and thereby permit the rolls to be mounted very close together.

2. In a drawing frame having a plurality of sets of top and bottom rolls provided with roller necks, and bearing stands provided with bearing blocks thereon for receiving the roller necks for the top and bottom rolls, alternate ones of said bearing blocks comprising a web portion extending beneath the roller necks of the rolls, and having means for securing the same to the bearing stands in adjusted position, and said web portion having uprising forked bearing receiving portions on the ends thereof, the other bearing blocks being of a length which is less than the distance between the forked bearing receiving portions of the first-named bearing blocks and having forked portions for receiving the roller necks of the other top and bottom rolls, and the web portion joining the first-named bearing blocks being cut away so that the end wall portions of the second-named bearing blocks can fit between the end wall portions of the forked portions on the ends of the web portions.

3. In a drawing frame having a plurality of sets of top and bottom rolls provided with roller necks, bearing stands and bearing blocks mounted thereon for receiving the top and bottom rolls for rotation, alternate bearing blocks being disposed along the longitudinal center of the bearing stand and having transversely disposed slots therein for receiving the bearings on the top and bottom roller necks, the other bearing blocks for the other top and bottom rolls comprising an elongated web portion having an uprising bearing block integral with each of its ends, the web portion being of less width than the width of the uprising bearing blocks on its ends whereby the bearing blocks for the alternate rolls can fit in overlapping relation with the uprising bearing blocks on the ends of the web portions to thereby permit the rolls to be mounted very close together, each of the roller necks of the bottom rolls having an anti-friction bearing thereon, each of the roller necks of the top rolls having an anti-friction bearing thereon mounted in a vertically slidable member, said vertically slidable members resting by gravity on the anti-friction bearings of the bottom roller necks.

4. In a drawing frame having a plurality of sets of top and bottom rolls having roller necks, and bearing stands provided with bearing blocks thereon for receiving the roller necks for the top and bottom rolls, alternate ones of said bearing blocks comprising a web portion extending beneath the roller necks, and having means for securing the same to the bearing stands in adjusted position, and said web portion having uprising forked bearing receiving portions at each end thereof, the other bearing blocks being of a length which is less than the distance between the forked portions of the first-named bearing blocks and having forked portions for receiving the roller necks of the other top and bottom rolls, the lengths of the second set of bearing blocks being less than the distance between the upstanding forked portions on the first-named bearing blocks and the web portion joining the first-named bearing blocks being cut away so that the wall portions of the second-named bearing blocks can fit between the wall portions of the forked portions of the ends of the first-named bearing blocks, each of the roller necks of the bottom rolls having an anti-friction bearing thereon, each of the roller necks of the top rolls having an anti-friction bearing thereon mounted in a vertically slidable member, said vertically slidable members resting by gravity on the anti-friction bearings on the bottom rolls.

ELVIN B. ROBINSON.

REFERENCES CITED

The following references are of record in the file of this patent:

UNITED STATES PATENTS

| Number | Name | Date |
| --- | --- | --- |
| 2,389,581 | Tarr | Nov. 20, 1945 |
| 2,412,357 | Robinson | Dec. 10, 1946 |